US012761518B2

(12) United States Patent
Shei et al.

(10) Patent No.: US 12,761,518 B2
(45) Date of Patent: Oct. 13, 2026

(54) DISPLAY DEVICE AND MANUFACTURING METHOD THEREOF

(71) Applicant: E Ink Holdings Inc., Hsinchu (TW)

(72) Inventors: Tsai-Wei Shei, Hsinchu (TW); Yen-Ze Huang, Hsinchu (TW); Yuan-Hsun Cheng, Hsinchu (TW); Yi-Hung Chen, Hsinchu (TW); Jen-Shiun Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 647 days.

(21) Appl. No.: 18/155,771

(22) Filed: Jan. 18, 2023

(65) Prior Publication Data

US 2024/0004254 A1 Jan. 4, 2024

(30) Foreign Application Priority Data

Jun. 29, 2022 (TW) .................................. 111124283

(51) Int. Cl.
*G02F 1/167* (2019.01)
*B32B 3/04* (2006.01)
(Continued)

(52) U.S. Cl.
CPC ................ *G02F 1/167* (2013.01); *B32B 3/04* (2013.01); *B32B 3/06* (2013.01); *B32B 3/263* (2013.01); *B32B 7/02* (2013.01); *B32B 7/12* (2013.01); *B32B 7/14* (2013.01); *B32B 37/12* (2013.01); *B32B 38/0012* (2013.01); *G02B 26/005* (2013.01); *G02F 1/16755* (2019.01); *G02F 1/1679* (2019.01); *B32B 17/06* (2013.01); *B32B 27/06* (2013.01); *B32B 27/308* (2013.01); *B32B 27/325* (2013.01); *B32B 2037/1253* (2013.01); *B32B 38/105* (2013.01); *B32B 2307/412* (2013.01); *B32B 2307/724* (2013.01);
(Continued)

(58) Field of Classification Search
None
See application file for complete search history.

(56) References Cited

U.S. PATENT DOCUMENTS 6,816,226 B2 * 11/2004 Bouten ............... G02F 1/13394 349/158
7,015,892 B1 * 3/2006 Nihira ..................... B43L 1/008 434/409
(Continued)

FOREIGN PATENT DOCUMENTS

CN 101710221 5/2010
CN 101989019 A * 3/2011
(Continued)

OTHER PUBLICATIONS

Machine Translation of CN108234701A, Jun. 2018 (Year: 2018).*
(Continued)

*Primary Examiner* — Jeffrey A Vonch
(74) *Attorney, Agent, or Firm* — JCIPRNET

(57) ABSTRACT

A display device includes a driving substrate, a display medium layer, a glue layer, and a protective layer. The display medium layer is disposed on the driving substrate. The glue layer is disposed around the display medium layer. The protective layer covers the display medium layer and the glue layer, and the protective layer is bent toward the driving substrate along the glue layer.

20 Claims, 3 Drawing Sheets

(51) Int. Cl.

| | |
|---|---|
| ***B32B 3/06*** | (2006.01) |
| ***B32B 3/26*** | (2006.01) |
| ***B32B 7/02*** | (2019.01) |
| ***B32B 7/12*** | (2006.01) |
| ***B32B 7/14*** | (2006.01) |
| ***B32B 37/12*** | (2006.01) |
| ***B32B 38/00*** | (2006.01) |
| ***G02B 26/00*** | (2006.01) |
| ***G02F 1/1675*** | (2019.01) |
| ***G02F 1/16755*** | (2019.01) |
| ***G02F 1/1679*** | (2019.01) |
| *B32B 17/06* | (2006.01) |
| *B32B 27/06* | (2006.01) |
| *B32B 27/30* | (2006.01) |
| *B32B 27/32* | (2006.01) |

(52) U.S. Cl.
CPC ... *B32B 2307/7242* (2013.01); *B32B 2457/20* (2013.01); *G02F 2201/50* (2013.01); *G02F 2201/503* (2013.01); *G02F 2202/28* (2013.01); *Y10T 428/23* (2015.01); *Y10T 428/239* (2015.01); *Y10T 428/2419* (2015.01); *Y10T 428/24488* (2015.01); *Y10T 428/24777* (2015.01); *Y10T 428/24942* (2015.01)

(56) References Cited

U.S. PATENT DOCUMENTS 8,553,316 B2 10/2013 Tsai et al.
9,568,800 B1 * 2/2017 Sprague .............. G02F 1/16753
9,658,392 B2 5/2017 Zhang
9,759,979 B2 9/2017 Wu et al.
9,870,023 B2 1/2018 Namkung et al.
9,995,956 B2 6/2018 Lu
10,114,267 B2 10/2018 Wu et al.
10,185,200 B1 * 1/2019 Sprague ............ G02F 1/133305
10,228,604 B1 * 3/2019 Ghali .................. G02F 1/13454
2004/0125320 A1 * 7/2004 Bouten ............... G02F 1/13394 349/156
2005/0162379 A1 * 7/2005 Harada ............... G02F 1/16757 345/107
2005/0179852 A1 * 8/2005 Kawai ............... G02F 1/133305 349/153
2005/0224935 A1 * 10/2005 Schaepkens ....... H10K 50/8426 257/678
2006/0278965 A1 * 12/2006 Foust ................. H10K 50/8423 257/678
2006/0291034 A1 * 12/2006 Patry ..................... G02F 1/0107 359/296
2007/0030436 A1 * 2/2007 Sasabayashi ......... G02F 1/1339 349/153
2007/0121051 A1 * 5/2007 Yokoyama .......... G02F 1/13394 349/156
2007/0152956 A1 * 7/2007 Danner ................. G02F 1/1679 345/107
2007/0176309 A1 * 8/2007 Kanbayashi .......... G02F 1/1679 264/1.1
2007/0177248 A1 * 8/2007 Kanbayashi ........ G02F 1/16756 359/296
2007/0211002 A1 * 9/2007 Zehner .................. G02F 1/1679 345/84
2008/0142801 A1 * 6/2008 Hsu ......................... G02F 1/167 257/E33.001
2009/0109498 A1 * 4/2009 Barclay ............... G06F 3/03547 358/474
2009/0109520 A1 * 4/2009 Park ........................ G02F 1/167 359/296
2009/0153947 A1 * 6/2009 Kurosawa ............. G02F 1/1679 359/296
2009/0185260 A1 * 7/2009 Uchida ................... G02F 1/167 359/296
2010/0157412 A1 * 6/2010 Lee ....................... G02F 1/1679 445/25
2010/0167002 A1 * 7/2010 Chu ..................... H10K 59/871 156/286
2010/0172015 A1 * 7/2010 Wang ...................... G09F 9/372 359/296
2010/0244005 A1 * 9/2010 Gyoda ............... H10K 59/8722 156/182
2010/0264817 A1 * 10/2010 Bouten .............. H10K 50/8426 313/512
2011/0235160 A1 * 9/2011 Hsieh ................ G02F 1/133305 359/296
2011/0286077 A1 * 11/2011 Chan ....................... G02F 1/167 359/296
2011/0299151 A1 * 12/2011 Wu ................... G02F 1/133308 359/296
2012/0087002 A1 * 4/2012 Hsieh ...................... G02F 1/167 156/60
2012/0098739 A1 * 4/2012 Hsieh .................... G02F 1/1679 345/107
2012/0120364 A1 * 5/2012 Wu ......................... G02F 1/167 445/25
2012/0154707 A1 * 6/2012 Hsieh .................... G02F 1/1333 313/511
2012/0176662 A1 * 7/2012 Luan ................... G02F 1/16753 359/296
2012/0200910 A1 * 8/2012 Hayashi .................. G02F 1/167 156/196
2012/0202030 A1 * 8/2012 Kondo ...................... C03C 8/08 156/247
2012/0250139 A1 * 10/2012 Abe ....................... G03G 17/04 359/296
2013/0120227 A1 * 5/2013 Tanikawa .......... G02F 1/133308 345/55
2014/0115884 A1 * 5/2014 Danner .................. H05K 13/00 29/829
2014/0118902 A1 * 5/2014 Kim .................. G02F 1/133308 361/679.01
2014/0211144 A1 * 7/2014 Shinohara ............. G02F 1/1339 349/153
2014/0293211 A1 * 10/2014 Terao .................... G02F 1/1339 349/153
2014/0353874 A1 * 12/2014 Han .................. B29C 45/14811 428/68
2015/0015933 A1 * 1/2015 Yamada ................ G02F 1/1341 156/146
2015/0370143 A1 * 12/2015 Nakashima ......... G02F 1/16756 156/60
2016/0099435 A1 * 4/2016 Yang ................. G02F 1/133308 257/88
2016/0116817 A1 * 4/2016 Wu ......................... G02F 1/167 359/296
2016/0226015 A1 * 8/2016 Kauhaniemi ..... G02F 1/133305
2016/0260915 A1 * 9/2016 Park ..................... H10K 59/131
2016/0299527 A1 * 10/2016 Kwak ................... G06F 1/1656
2017/0047351 A1 * 2/2017 Kwon ..................... B29B 11/00
2018/0033571 A1 * 2/2018 Choi ..................... G06F 1/1671
2018/0170263 A1 * 6/2018 Heintzelman ........... G02F 1/157
2018/0235091 A1 * 8/2018 Kim ....................... G04G 21/00
2018/0259805 A1 * 9/2018 Takehara .......... G02F 1/133305
2018/0368270 A1 * 12/2018 Seo .......................... G06F 1/16
2019/0025621 A1 * 1/2019 Shin ........................ G02F 1/017
2019/0129270 A1 * 5/2019 Ishizaki .............. G02F 1/16753
2019/0129271 A1 * 5/2019 Lin ...................... G02B 26/005
2019/0346732 A1 * 11/2019 Parker ............... B32B 17/10513
2019/0375195 A1 * 12/2019 Choi ................... H04M 1/0266
2020/0020754 A1 * 1/2020 Kim ..................... H05K 1/0281
2020/0029423 A1 * 1/2020 Kwon ............... G02F 1/133305
2020/0096811 A1 * 3/2020 Kwak ............... G02F 1/133305
2020/0136069 A1 * 4/2020 Paek ..................... B32B 15/046
2020/0198195 A1 * 6/2020 Ren ......................... B29C 45/14
2020/0209925 A1 * 7/2020 Paek ................. G02F 1/133305
2020/0333849 A1 * 10/2020 Cho ........................ G06F 1/182
2021/0018812 A1 * 1/2021 Lin ..................... G02F 1/16755
2021/0127517 A1 * 4/2021 Kim .......................... B32B 3/02
2021/0325758 A1 * 10/2021 Huang .................. G02F 1/1675
2021/0333680 A1 * 10/2021 Bao ....................... G02F 1/1675

(56) References Cited

U.S. PATENT DOCUMENTS

| | | | | |
|---|---|---|---|---|
| 2021/0370642 | A1* | 12/2021 | Kim | B32B 17/10 |
| 2022/0299815 | A1* | 9/2022 | Wei | G02F 1/133308 |
| 2022/0334448 | A1* | 10/2022 | Jacobsen | G02F 1/01 |
| 2023/0071169 | A1* | 3/2023 | Wang | H04M 1/0266 |
| 2023/0204993 | A1* | 6/2023 | Lee | G02F 1/1333 |
| | | | | 361/679.01 |
| 2023/0263004 | A1* | 8/2023 | Soyseven | H10K 77/111 |
| | | | | 257/40 |
| 2024/0083145 | A1* | 3/2024 | Uchida | B32B 17/10036 |
| 2024/0192565 | A1* | 6/2024 | Cheng | G02F 1/1675 |
| 2024/0288742 | A1* | 8/2024 | Harris | G02F 1/1679 |
| 2024/0427380 | A1* | 12/2024 | Guo | G06F 1/1656 |

FOREIGN PATENT DOCUMENTS

| | | | | | |
|---|---|---|---|---|---|
| CN | 102157110 | | | 8/2011 | |
| CN | 102385214 | | | 3/2012 | |
| CN | 102621761 | | | 8/2012 | |
| CN | 103568394 | | | 2/2014 | |
| CN | 103809342 | A | * | 5/2014 | |
| CN | 104280973 | A | * | 1/2015 | G02F 1/167 |
| CN | 105652551 | | | 6/2016 | |
| CN | 105655299 | | | 6/2016 | |
| CN | 106297583 | A | * | 1/2017 | G09F 9/372 |
| CN | 106875840 | A | * | 6/2017 | G09F 9/00 |
| CN | 106920466 | A | * | 7/2017 | C08J 7/04 |
| CN | 107167981 | A | * | 9/2017 | G02F 1/167 |
| CN | 108107631 | A | * | 6/2018 | G02F 1/1339 |
| CN | 108234701 | A | * | 6/2018 | H04M 1/0266 |
| CN | 108333648 | A | * | 7/2018 | G09F 9/372 |
| CN | 108427233 | | | 8/2018 | |
| CN | 105185809 | | | 9/2018 | |
| CN | 108508674 | A | * | 9/2018 | G02F 1/167 |
| CN | 108957897 | A | * | 12/2018 | G02F 1/1339 |
| CN | 208654505 | | | 3/2019 | |
| CN | 109613732 | A | * | 4/2019 | G02F 1/1333 |
| CN | 209746325 | | | 12/2019 | |
| CN | 209962062 | U | * | 1/2020 | |
| CN | 111010466 | A | * | 4/2020 | H04M 1/0266 |
| CN | 111948867 | A | * | 11/2020 | G02F 1/167 |
| CN | 113281936 | | | 8/2021 | |
| CN | 113625500 | | | 11/2021 | |
| CN | 114495719 | A | * | 5/2022 | G09F 9/301 |
| IN | 113391495 | | | 9/2021 | |
| JP | H0895023 | A | * | 4/1996 | |
| JP | 2007078850 | A | * | 3/2007 | |
| JP | 2007127763 | A | * | 5/2007 | |
| JP | 2007171447 | A | * | 7/2007 | |
| JP | 2007219503 | A | * | 8/2007 | G09G 3/3446 |
| JP | 2008129327 | A | * | 6/2008 | |
| JP | 2008209695 | A | * | 9/2008 | |
| JP | 2009238760 | A | * | 10/2009 | |
| JP | 2010015047 | A | * | 1/2010 | |
| JP | 2010151897 | A | * | 7/2010 | |
| JP | 2011150233 | A | * | 8/2011 | |
| JP | 2011221401 | A | * | 11/2011 | |
| JP | 2018045033 | A | * | 3/2018 | |
| KR | 20120043318 | A | * | 5/2012 | G02F 1/133305 |
| KR | 101657136 | B1 | * | 9/2016 | G06F 3/041 |
| KR | 20160126788 | A | * | 11/2016 | G02F 1/167 |
| TW | I595461 | | | 8/2017 | |
| WO | WO-2006059256 | A1 | * | 6/2006 | G02F 1/167 |
| WO | WO-2014115825 | A1 | * | 7/2014 | H10K 50/8426 |
| WO | WO-2015107395 | A1 | * | 7/2015 | G02F 1/1339 |
| WO | WO-2019142950 | A1 | * | 7/2019 | C09J 175/04 |
| WO | 2020168700 | | | 8/2020 | |
| WO | WO-2021190033 | A1 | * | 9/2021 | G02F 1/167 |
| WO | WO-2022206956 | A1 | * | 10/2022 | G02F 1/1685 |

OTHER PUBLICATIONS

Machine Translation of WO2014115825A1, Jul. 2014 (Year: 2014).*
Machine Translation of WO2019142950A1, Jul. 2019 (Year: 2019).*
"Office Action of China Counterpart Application", issued on Apr. 13, 2026, p. 1-p. 8.
"Office Action of China Counterpart Application", issued on Jun. 23, 2026, pp. 1-8.

* cited by examiner

DISPLAY DEVICE AND MANUFACTURING METHOD THEREOF

CROSS-REFERENCE TO RELATED APPLICATION

This application claims the priority benefits of Taiwan application serial no. 111124283, filed on Jun. 29, 2022. The entirety of the above-mentioned patent application is hereby incorporated by reference herein and made a part of this specification.

BACKGROUND

Technical Field

The present disclosure relates to a display device and a manufacturing method thereof, particularly to a display device with improved lateral waterproof effect and a manufacturing method thereof.

Description of Related Art

In a conventional electronic paper (e-paper) display, the display medium layer is disposed between a protective layer and a driving substrate. After these components are assembled, glue is dispensed between the protective layer and the display medium layer to form a glue layer, which extends to cover the surrounding surface of the protective layer to serve as a lateral moisture barrier structure for the e-paper display. However, as the water vapor transmission rate (WVTR) of the glue layer is greater than that of the protective layer, the display medium layer does not have a good waterproof effect in its lateral direction, thereby affecting the structural reliability of the e-paper display.

SUMMARY

The disclosure provides a display device and a manufacturing method thereof capable of improving the lateral waterproof effect and providing better structural reliability.

The display device of the disclosure includes a driving substrate, a display medium layer, a glue layer, and a protective layer. The display medium layer is disposed on the driving substrate. The glue layer is disposed around the display medium layer. The protective layer covers the display medium layer and the glue layer, and the protective layer is bent toward the driving substrate along the glue layer.

In an embodiment of the disclosure, the display medium layer and the glue layer are completely wrapped between the driving substrate and the protective layer.

In an embodiment of the disclosure, the driving substrate has a surface, and the protective layer is bent onto the surface and covers part of the surface along an extending direction of the driving substrate.

In an embodiment of the disclosure, a first side edge of the protective layer, a second side edge of the glue layer, and a side edge of the driving substrate are aligned to one another.

In an embodiment of the disclosure, the display device further includes an adhesive layer disposed between the protective layer and the display medium layer and between the protective layer and the glue layer. A third side edge of the adhesive layer is aligned with the first side edge of the protective layer, the second side edge of the glue layer, and the side edge of the driving substrate.

In an embodiment of the disclosure, a first side edge of the protective layer is aligned with a second side edge of the glue layer, and the glue layer covers a side edge of the driving substrate.

In an embodiment of the disclosure, the display device further includes an adhesive layer disposed between the protective layer and the display medium layer and between the protective layer and the glue layer. A third side edge of the adhesive layer is aligned with the first side edge of the protective layer and the second side edge of the glue layer.

In an embodiment of the disclosure, the thickness of the display medium layer is H1, the distance between one edge of the driving substrate and the protective layer is H2, and $H2<\frac{1}{2}*H1$.

In an embodiment of the disclosure, the water vapor transmission rate of the glue layer is less than 30 $g/m^2/day$.

In an embodiment of the disclosure, the water vapor transmission rate of the protective layer is less than 1 $g/m^2/day$.

In an embodiment of the disclosure, the material of the protective layer includes a light-transmitting material, and the light transmittance of the protective layer is greater than 80%.

The manufacturing method of the display device of the disclosure includes the following steps. A driving substrate is provided. A display medium layer is disposed on the driving substrate. A glue layer is formed around the display medium layer. A protective layer is attached to the display medium layer. And a curing process is performed on the glue layer, and the protective layer is bent toward the driving substrate along the glue layer.

In an embodiment of the disclosure, the protective layer is attached to the display medium layer before the glue layer is formed around the display medium layer, and the glue layer covers a side edge of the driving substrate.

In an embodiment of the disclosure, the manufacturing method of the display device further includes performing a cutting process to cut the protective layer and the glue layer.

In an embodiment of the disclosure, a first side edge of the protective layer, a second side edge of the glue layer, and a side edge of the driving substrate are aligned to one another.

In an embodiment of the disclosure, a first side edge of the protective layer is aligned with a second side edge of the glue layer.

In an embodiment of the disclosure, the manufacturing method of the display device further includes forming an adhesive layer on the display medium layer before the protective layer is attached on the display medium layer, and after the glue layer is formed around the display medium layer, a cutting process is performed to cut the protective layer, the adhesive layer, and the glue layer.

In an embodiment of the disclosure, a third side edge of the adhesive layer is aligned with a first side edge of the protective layer, a second side edge of the glue layer, and a side edge of the driving substrate.

In an embodiment of the disclosure, a third side edge of the adhesive layer is aligned with a first side edge of the protective layer and a second side edge of the glue layer.

In an embodiment of the disclosure, the protective layer is attached to the display medium layer after the glue layer is formed around the display medium layer, and the display medium layer and the glue layer are completely wrapped between the driving substrate and the protective layer.

Based on the above, in the design of the display device of the disclosure, as the protective layer covers the display medium layer and the glue layer and is bent toward the driving substrate along the glue layer, the protective layer not only protects the display medium layer from above, but also bends toward the driving substrate to protect the display medium layer from the lateral direction. In this way, the display medium layer is protected by the protective layer from the direction above and also in the lateral direction, improving the moisture barrier effect of the display medium layer in the lateral direction and preventing the display medium layer from being damaged by moisture from the lateral direction. In this light, the display device of the disclosure has better structural reliability.

To make the features and advantages of the disclosure more comprehensible, embodiments are described in detail hereinafter with reference to the following drawings.

DESCRIPTION OF THE EMBODIMENTS

The embodiments of the disclosure may be understood with reference to the drawings, and the drawings of the disclosure are also part of the disclosure description. It is to be understood that the drawings of the disclosure are not to scale and the dimensions of elements may be, in fact, enlarged or reduced conveniently to represent more clearly the features of the disclosure.

Figure 1:
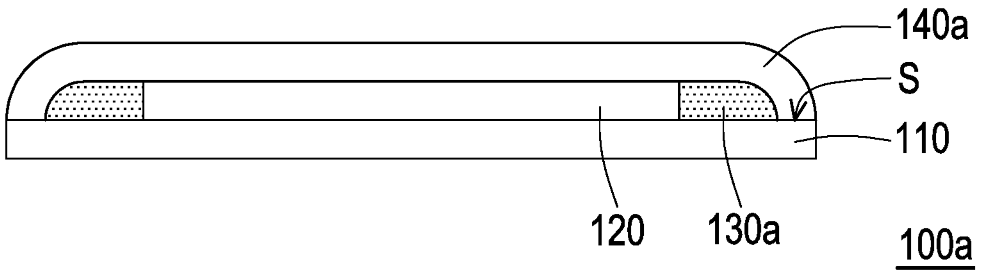
FIG. 1 is a schematic diagram of a display device according to an embodiment of the disclosure.

FIG. 1 is a schematic diagram of a display device according to an embodiment of the disclosure. Please refer to FIG. 1. In this embodiment, the display device 100*a* includes a driving substrate 110, a display medium layer 120, a glue layer 130*a*, and a protective layer 140*a*. The display medium layer 120 is disposed on the driving substrate 110. The glue layer 130*a* is disposed around the display medium layer 120. The protective layer 140*a* covers the display medium layer 120 and the glue layer 130*a*, and the protective layer 140*a* is bent toward the driving substrate 110 along the glue layer 130*a*.

Specifically, in this embodiment, the driving substrate 110 has a surface S, and the driving substrate 110 is, for example, an active element array substrate, such as a thin film transistor (TFT) array substrate or a thin film diode (TFD) array substrate, but the disclosure is not limited thereto. The display medium layer 120 is disposed on the surface S of the driving substrate 110, and the display medium layer 120 is, for example, an electrophoretic display film or an electrowetting display film, but the disclosure is not limited thereto. The glue layer 130*a* is disposed around the periphery of the display medium layer 120 and fills the gap between the protective layer 140*a* and the driving substrate 110. The water vapor transmission rate (WVTR) of the glue layer 130*a* is less than 30 $g/m^2$/day, and the glue layer 130*a* is, for example, epoxy, polymethylmethacrylate (PMMA), or silicone, but the disclosure is not limited thereto. The protective layer 140*a* is bent downward toward the driving substrate 110 onto the surface S of the driving substrate 110 to shield the display medium layer 120 from the lateral direction. Meanwhile, the display medium layer 120 and the glue layer 130*a* are completely wrapped between the driving substrate 110 and the protective layer 140*a*. Preferably, the material of the protective layer 140*a* is, for example, a light-transmitting material, such as polymethyl methacrylate (PMMA) and glass, or a soft material such as polystyrene (PS), but the disclosure is not limited thereto. The light transmittance of the protective layer 140*a* is greater than 80%. Here, the water vapor transmission rate of the protective layer 140*a* is, for example, less than 1 $g/m^2$/day, meaning that the waterproof effect of the protective layer 140*a* is better than that of the glue layer 130*a*.

In this embodiment, as the protective layer 140*a* above the display medium layer 120 is extended, the protective layer 140*a* is characteristically bending/curving in the lateral direction of the display medium layer 120 to protect the display medium layer 120 in the lateral direction, blocking the water vapor in the lateral direction to thereby improve the lateral waterproof effect. In addition, except for the display medium layer 120, the rest of the space between the curved protective layer 140*a* and the driving substrate 110 is filled with a glue layer 130*a* acting as a moisture barrier.

Please refer to FIG. 1 again for the fabrication of the display device 100*a* of this embodiment. First, a driving substrate 110 is provided. Next, a display medium layer 120 is disposed on the driving substrate 110. A glue layer 130*a* is then formed around the display medium layer 120, and a curing process is performed on the glue layer 130*a*. The glue layer 130*a* is formed on a surface S of the driving substrate 110 by glue dispensing, and the glue layer 130*a* is then cured by UV curing or thermal curing. Finally, before the glue layer 130*a* is fully cured, the protective layer 140*a* is attached on the display medium layer 120 and the glue layer 130*a*, and the protective layer 140*a* is bent toward the driving substrate 110 along the glue layer 130*a*, such that the display medium layer 120 and the glue layer 130*a* are completely wrapped between the driving substrate 110 and the protective layer 140*a*. The fabrication of the display device 100*a* has been completed so far.

In short, as the protective layer 140*a* in this embodiment covers the display medium layer 120 and the glue layer 130*a* and is bent toward the driving substrate 110 along the glue layer 130*a*, the protective layer 140*a* not only protects the display medium layer 120 from above, but also bends downward toward the driving substrate 110 to protect the display medium layer 120 from the lateral direction. In this way, the display medium layer 120 is protected by the protective layer 140*a* from the direction above and also in the lateral direction, improving the moisture barrier effect of the display medium layer 120 in the lateral direction and preventing the display medium layer 120 from being damaged by moisture from the lateral direction. In this light, the display device 100*a* of this embodiment has better structural reliability.

Note here that the following embodiments adopt the element referential numbers and part of the contents of the previous embodiments, and the same referential numbers represent the same or similar elements. Description of the same technical contents is omitted hereinafter. For the description of the omitted part, reference may be made to the foregoing embodiments, and the same descriptions will not be repeated in the following embodiments.

Figure 2:
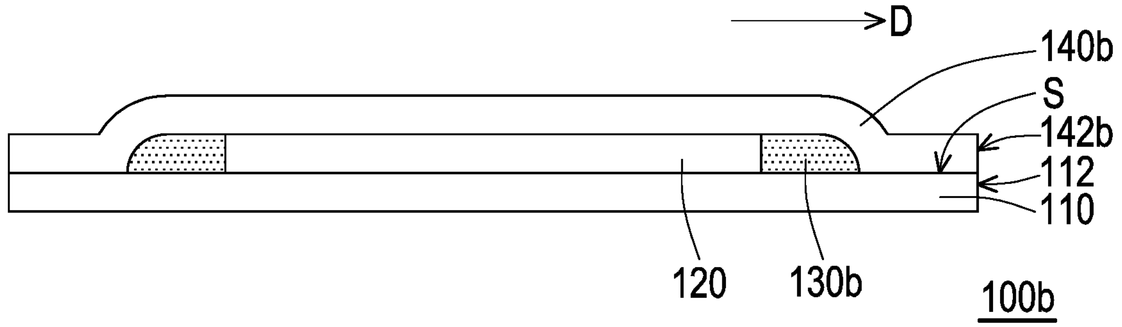
FIG. 2 is a schematic diagram of a display device according to another embodiment of the disclosure.

FIG. 2 is a schematic diagram of a display device according to another embodiment of the disclosure. Please refer to FIG. 1 and FIG. 2 simultaneously. The display device 100*b* of this embodiment is similar to the display device 100*a* of FIG. 1. The difference between the two is that in this embodiment, the protective layer 140*b* is bent onto the surface S of the driving substrate 110 and covers part of the surface S along an extending direction D of the driving substrate 110. The display medium layer 120 and the glue layer 130*b* are completely wrapped between the driving substrate 110 and the protective layer 140*b*. Here, a first side edge 142*b* of the protective layer 140*b* is aligned with a side edge 112 of the driving substrate 110.

Figure 3:
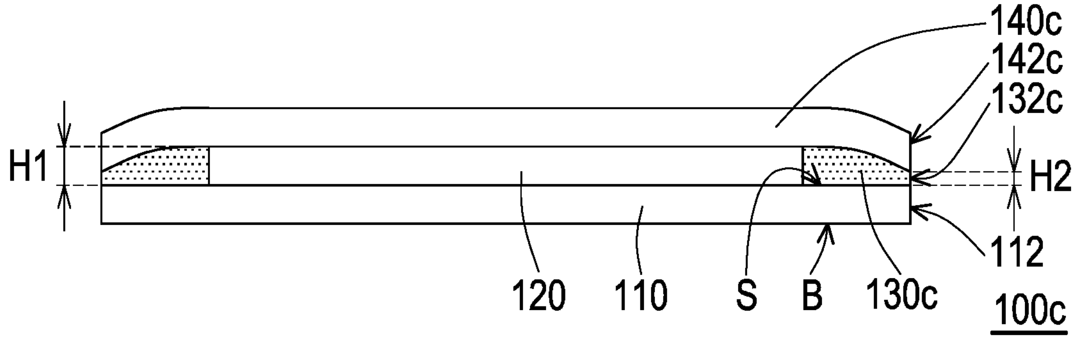
FIG. 3 is a schematic diagram of a display device according to another embodiment of the disclosure.

FIG. 3 is a schematic diagram of a display device according to another embodiment of the disclosure. Please refer to FIG. 1 and FIG. 3 simultaneously. The display device 100*c* of this embodiment is similar to the display device 100*a* of FIG. 1. The difference between the two is that in this embodiment, a first side edge 142*c* of the protective layer 140*c*, a second side edge 132*c* of the glue layer 130*c*, and a side edge 112 of the driving substrate 110 are aligned to one another. Preferably, the thickness of the display medium layer 120 is H1, the distance between the side edge 112 of the driving substrate 110 and the protective layer 140*c* is H2, and H2<½*H1. When the material of the protective layer 140*c* is polystyrene (PS), the display device 100*c* has the characteristics of a narrow border.

For the fabrication of the display device 100*c*, please refer to FIG. 1 and FIG. 3 simultaneously. The manufacturing method of the display device 100*c* in this embodiment is similar to the manufacturing method of the display device 100*a* mentioned above. The difference between the two is that in this embodiment, the protective layer 140*c* is attached to the display medium layer 120 before the glue layer 130*c* is formed around the display medium layer 120. In other words, in this embodiment, the protective layer 140*c* is attached first before the glue layer 130*c* is formed. Glue is dispensed from a backside B of the driving substrate 110 to form the glue layer 130*c* that covers the side edge 112 of the driving substrate 110, and the glue layer 130*c* is then cured by UV curing or thermal curing. After that, the manufacturing method of the display device 100*c* of this embodiment further includes a cutting process to cut the protective layer 140*c* and the glue layer 130*c*, aligning the first side edge 142*c* of the protective layer 140*c*, the second side edge 132*c* of the glue layer 130*c*, and the side edge 112 of the driving substrate 110. The fabrication of the display device 100*c* has been completed so far.

Figure 4:
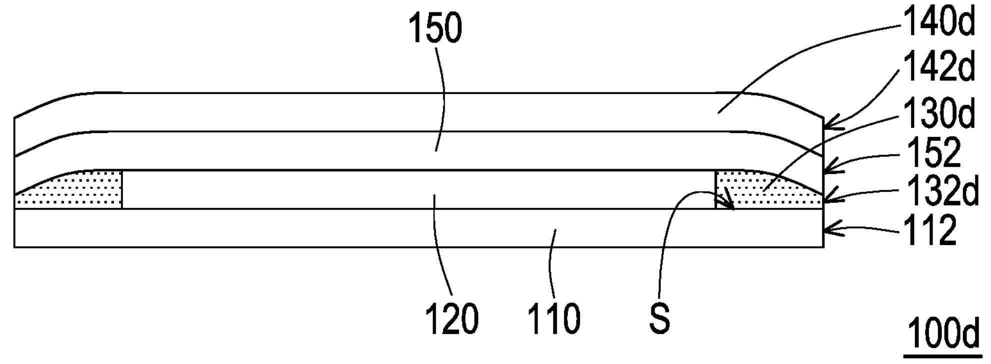
FIG. 4 is a schematic diagram of a display device according to another embodiment of the disclosure.

FIG. 4 is a schematic diagram of a display device according to another embodiment of the disclosure. Please refer to FIG. 3 and FIG. 4 simultaneously. The display device 100*d* of this embodiment is similar to the display device 100*c* of FIG. 3. The difference between the two is that in this embodiment, the display device 100*d* further includes an adhesive layer 150 disposed between a protective layer 140*d* and a display medium layer 120 and between the protective layer 140*d* and a glue layer 130*d* to connect the protective layer 140*d* and the display medium layer 120. The adhesive layer 150 is, for example, optically clear adhesive (OCA) or pressure sensitive adhesive (PSA), but the disclosure is not limited thereto. Here, a third side edge 152 of the adhesive layer 150 is aligned with the first side edge 142*d* of the protective layer 140*d*, the second side edge 132*d* of the glue layer 130*d*, and the side edge 112 of the driving substrate 110.

For the fabrication of the display device 100*d*, please refer to FIG. 3 and FIG. 4 simultaneously. The manufacturing method of the display device 100*d* in this embodiment is similar to the manufacturing method of the display device 100*c* mentioned above. The difference between the two is that in this embodiment, the manufacturing method of the display device 100*d* further includes forming an adhesive layer 150 on the display medium layer 120 before attaching the protective layer 140*d* on the display medium layer 120. After the protective layer 140*d* is attached on the adhesive layer 150, a glue layer 130*d* covering the side edge 112 of the driving substrate 110 is formed by glue dispensing, and the glue layer 130*d* is then cured by UV curing or thermal curing. Finally, a cutting process is performed to cut the protective layer 140*d*, the adhesive layer 150, and the glue layer 130*d*, such that the third side edge 152 of the adhesive layer 150 is aligned with the first side edge 142*d* of the protective layer 140*d*, the second side edge 132*d* of the glue layer 130*d*, and the side edge 112 of the driving substrate 110. The fabrication of the display device 100*d* has been completed so far.

Figure 5:
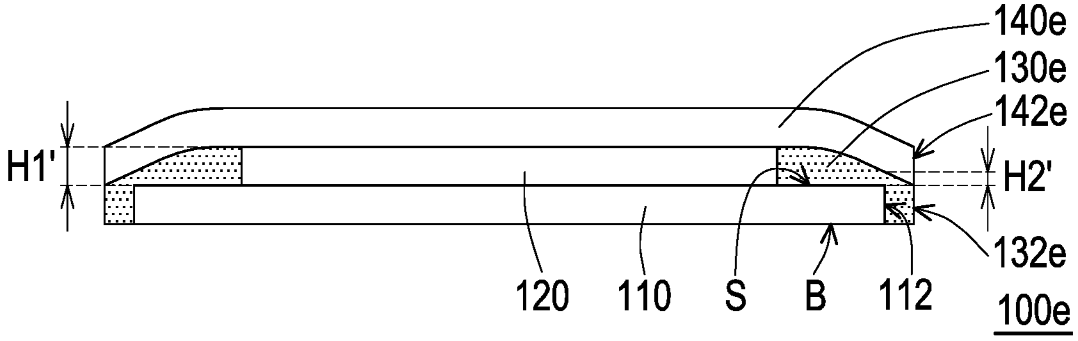
FIG. 5 is a schematic diagram of a display device according to yet another embodiment of the disclosure.

FIG. 5 is a schematic diagram of a display device according to yet another embodiment of the disclosure. Please refer to FIG. 1 and FIG. 5 simultaneously. The display device 100*e* of this embodiment is similar to the display device 100*a* of FIG. 1. The difference between the two is that in this embodiment, the first side edge 142*e* of the protective layer 140*e* is aligned with a second side edge 132*e* of the glue layer 130*e*, and the glue layer 130*e* covers the side edge 112 of the driving substrate 110. Here, the thickness of the display medium layer 120 is H1', the distance between the side edge 112 of the driving substrate 110 and the protective layer 140*e* is H2', and H2'<½*H1'.

For the fabrication of the display device 100*e*, please refer to FIG. 1 and FIG. 5 simultaneously. The manufacturing method of the display device 100*e* of this embodiment is similar to the manufacturing method of the display device 100*a* mentioned above. The difference between the two is that in this embodiment, the protective layer 140 *e* is attached to the display medium layer 120 before the glue layer 130*e* is formed around the display medium layer 120. In other words, in this embodiment, the protective layer 140*e* is attached first, and then the glue layer 130*e* is formed, and glue is dispensed from the backside B of the driving substrate 110 to form the glue layer 130*e* that covers the side edge 112 of the driving substrate 110, and the glue layer 130*e* is then cured by UV curing or thermal curing. After that, the manufacturing method of the display device 100*e* of this embodiment further includes a cutting process to cut the protective layer 140*e* and the glue layer 130*e*, such that the first side edge 142*e* of the protective layer 140*e* is aligned with the second side edge 132*e* of the glue layer 130*e*. The fabrication of the display device 100*e* has been completed so far.

Figure 6:
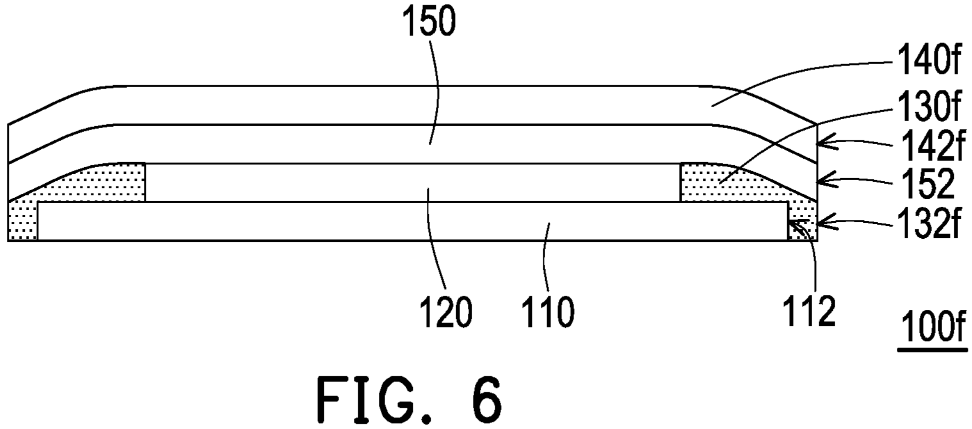
FIG. 6 is a schematic diagram of a display device according to still another embodiment of the disclosure.

FIG. 6 is a schematic diagram of a display device according to still another embodiment of the disclosure. Please refer to FIG. 5 and FIG. 6 simultaneously. The display device 100*f* of this embodiment is similar to the display device 100*e* of FIG. 5. The difference between the two is that, in this embodiment, the display device 100*f* further includes an adhesive layer 150 disposed between the protective layer 140*f* and the display medium layer 120 and between the protective layer 140*f* and the glue layer 130*f* to connect the protective layer 140*f* and the display medium layer 120. The adhesive layer 150 is, for example, optically clear adhesive (OCA) or pressure sensitive adhesive (PSA), but the disclosure is not limited thereto. Here, a third side edge 152 of the adhesive layer 150 is aligned with the first side edge 142*f* of the protective layer 140*f* and the second side edge 132*f* of the glue layer 130*f*.

For the fabrication of the display device 100*f*, please refer to FIG. 5 and FIG. 6 simultaneously. The manufacturing method of the display device 100*f* in this embodiment is similar to the manufacturing method of the display device 100*e* described above. The difference between the two is that in this embodiment, the manufacturing method of the display device 100*f* further includes forming an adhesive layer 150 on the display medium layer 120 before attaching the protective layer 140*f* on the display medium layer 120. The protective layer 140*f* is attached on the adhesive layer 150 before a glue layer 130*f* covering the side edge 112 of the driving substrate 110 is formed by glue dispensing, and the glue layer 130*f* is then cured by UV curing or thermal curing. Finally, a cutting process is performed to cut the protective layer 140*f*, the adhesive layer 150*f*, and the glue layer 130*f*, such that the third side edge 152 of the adhesive layer 150 is aligned with the first side edge 142*f* of the protective layer 140*f* and the second side edge 132*f* of the glue layer 130*f*. The fabrication of the display device 100*f* has been completed so far.

To sum up, in the design of the display device of the disclosure, as the protective layer covers the display medium layer and the glue layer and is bent toward the driving substrate along the glue layer, the protective layer not only protects the display medium layer from above, but also bends downward toward the driving substrate to protect the display medium layer from the lateral direction. In this way, the display medium layer is protected by the protective layer from the direction above and also in the lateral direction, improving the moisture barrier effect of the display medium layer in the lateral direction and preventing the display medium layer from being damaged by moisture from the lateral direction. In this light, the display device of the disclosure has better structural reliability.

Although the disclosure has been disclosed by the embodiments above, they are not intended to limit the disclosure. Anyone with ordinary knowledge in the art can make changes and modifications without departing from the spirit and scope of the disclosure. The protection scope of the disclosure shall be therefore determined by the scope of the claims appended.

What is claimed is:

1. A display device, comprising:

an electrically driving substrate;

a display medium layer disposed on the electrically driving substrate, wherein the display medium layer comprises an electrophoretic display film or an electrowetting display film;

a glue layer disposed around the display medium layer, the glue layer comprising a flat portion and a bent portion, wherein the flat portion connects to the display medium layer and extends outwardly from a periphery of the display medium layer by a distance, a top surface of the flat portion is flush with a top of the display medium layer, wherein in a cross-sectional view along a thickness direction of the display medium, a cross-sectional area of the flat portion is greater than a cross-sectional area of the bent portion, and the bent portion connects the flat portion and the electrically driving substrate; and a protective layer covering the display medium layer and the glue layer, wherein the glue layer fills a gap between the protective layer and the electrically driving substrate, and the protective layer is bent toward the electrically driving substrate along the glue layer, such that the display medium layer and the glue layer are completely wrapped between the electrically driving substrate and the protective layer.

2. The display device according to claim 1, wherein the electrically driving substrate has a surface, and a side edge of the protective layer is bent onto the surface and covers a part of the surface.

3. The display device according to claim 2, wherein the part of the surface is adjacent a side edge of the electrically driving substrate such that a surface of the bent protective layer opposite the glue layer is aligned with the side edge of the electrically driving substrate.

4. The display device according to claim 1, wherein the electrically driving substrate has a surface, and the protective layer is bent onto the surface and covers part of the surface along an extending direction of the electrically driving substrate.

5. The display device according to claim 4, wherein a side edge of the protective layer is aligned with a side edge of the electrically driving substrate.

6. The display device according to claim 1, wherein a water vapor transmission rate of the glue layer is less than 30 $g/m^2/day$.

7. The display device according to claim 6, wherein the glue layer is an epoxy, polymethylmethacrylate, or silicone.

8. The display device according to claim 1, wherein a water vapor transmission rate of the protective layer is less than 1 $g/m^2/day$.

9. The display device according to claim 8, wherein a material of the protective layer is glass, polymethylmethacrylate, or polystyrene.

10. The display device according to claim 1, wherein a material of the protective layer comprises a light-transmitting material, and a light transmittance of the protective layer is greater than 80%.

11. A manufacturing method of the display device according to claim 1, comprising:

providing the electrically driving substrate;

disposing the display medium layer on the electrically driving substrate;

forming the glue layer around the display medium layer;

attaching the protective layer to the display medium layer; and performing a curing process on the glue layer, wherein the protective layer is bent toward the electrically driving substrate along the glue layer.

12. The manufacturing method of the display device according to claim 11, wherein the protective layer is attached to the display medium layer before or after the glue layer is formed around the display medium layer.

13. The manufacturing method of the display device according to claim 11, wherein the curing process is a thermal curing process or a UV curing process.

14. The manufacturing method of the display device according to claim 11, wherein the electrically driving substrate has a surface, and a side edge of the protective layer is bent onto the surface and covers a part of the surface.

15. The manufacturing method of the display device according to claim 14, wherein the part of the surface is adjacent a side edge of the electrically driving substrate such that a surface of the bent protective layer opposite the glue layer is aligned with the side edge of the electrically driving substrate.

16. The manufacturing method of the display device according to claim 11, wherein the electrically driving substrate has a surface, and the protective layer is bent onto the surface and covers part of the surface along an extending direction of the electrically driving substrate.

17. The manufacturing method of the display device according to claim 16, wherein a side edge of the protective layer is aligned with a side edge of the electrically driving substrate.

18. The manufacturing method of the display device according to claim 11, wherein a water vapor transmission rate of the glue layer is less than 30 $g/m^2/day$.

19. The manufacturing method of the display device according to claim 11, wherein a water vapor transmission rate of the protective layer is less than 1 $g/m^2/day$.

20. The manufacturing method of the display device according to claim 11, wherein a material of the protective layer comprises a light-transmitting material, and a light transmittance of the protective layer is greater than 80%.

* * * * *